United States Patent [19]
Logue

[11] 3,905,493
[45] Sept. 16, 1975

[54] TAILGATE FOR DUMP TRUCK

[76] Inventor: George E. Logue, 321 Winters Ln., Montoursville, Pa. 17754

[22] Filed: July 14, 1972

[21] Appl. No.: 272,025

Related U.S. Application Data

[63] Continuation-in-part of Ser. No. 244,121, April 14, 1972, abandoned.

[52] U.S. Cl............ 214/75 T; 214/77 R; 214/77 P; 296/56
[51] Int. Cl.$^2$............................................ B60P 1/48
[58] Field of Search.......... 214/501, 503, 504, 77 R, 214/77 P, 78, 80, 353, 75 R, 75 H, 75 T; 296/50, 51, 56; 298/23 MD, 23 S; 49/40; 105/261 A, 364

[56] References Cited
UNITED STATES PATENTS

| | | | |
|---|---|---|---|
| 1,998,731 | 4/1935 | Newcomb | 105/261 A |
| 2,179,679 | 11/1939 | Abkowitz | 105/364 |
| 2,242,719 | 5/1941 | Freshwater | 296/56 X |
| 2,683,545 | 7/1954 | Wood | 214/77 P X |
| 2,748,964 | 6/1956 | Murphy | 214/503 |
| 3,554,398 | 1/1971 | Nickel | 214/503 |

FOREIGN PATENTS OR APPLICATIONS
218,533  1/1968  Sweden ............................ 214/77 P Primary Examiner—Robert J. Spar
Assistant Examiner—Leslie J. Paperner
Attorney, Agent, or Firm—Lowe, King & Price

[57] ABSTRACT

An end panel and two side panels or members form a composite U-shaped tailgate with the side panels being pivotally attached to the sides of the dump box. The length of the side panels is such that the power operated tailgate can lift loads from the ground to the dump box and position the load at any desired location. The power means is preferably a hydraulic cylinder, whose base may be shifted fore and aft to provide preferred locations for effecting moving the tailgate over center in both directions with and without a load. In one embodiment, an over center latching mechanism allows secure positioning of the base at opposite ends of the elongated guide slot, and then automatic release at the over center point of the gate for shifting the base by drawing up the cylinder on the piston. Pivoting the tailgate at substantially the midpoint of the box permits the tailgate to have maximum load clearance and to be positioned at the front of the box for out-of-the-way stowage and truck cab protection. The side panels of the tailgate engage in guiding relationship with the side walls of the box to draw the same inward each time the tailgate is closed whereby fixed cross support is unnecessary. The tailgate may be raised slightly and held by the power means for spreading operations.

12 Claims, 10 Drawing Figures

TAILGATE FOR DUMP TRUCK

The present application is a continuation-in-part of copending U.S. Pat. Application Ser. No. 244,121, filed Apr. 14, 1972, now abandoned.

The present invention relates to improvement in tailgates for a vehicle dump box, and more particularly, to a tailgate having side panels pivoted forward along the sides of the box for operational and functional advantage.

BACKGROUND OF THE INVENTION

Tailgates for vehicle dump bodies of conventional design are pivoted at the top rear end of the dump box along a pivot support that extends across the full width of the box. The tailgate is normally actuated simply by gravity after uncoupling the lower edge of the gate and raising the dump box. This tailgate is acceptable for some typical uses of a dump truck, such as hauling dirt that is free of large boulders or tree stumps and for dumping crushed stone where a fine regulation of the stone along a path is not needed. However, this standard tailgate design greatly restricts the versatility of the truck to which it is attached, and presents limitations in its operations.

In many construction operations, a dump truck could be put to beneficial use, especially when travelling between the central office and a job site by carrying a load of supplies or equipment. For example, in laying a pipe for a sewer line, a dump truck could carry a load of pipe and an air compressor to the job site, unload the pipe and compressor and then perform a function of transporting dirt or fill as required on the job. Heretofore, the use of a dump truck as a materials transport vehicle has been limited to situations where a crane is located both at the beginning and terminal ends of the trip. The need for a self-loading dump truck that can handles supplies, such as sewer pipe sections, and equipment, such as small air compressors is thus identified.

Secondly, a tailgate that is pivoted at the rear of the box limits the height of the load that may be conveniently dumped. Especially, in road building operations, it is frequently necessary to transport large boulders and/or tree stumps that are greater in height than the side walls of the dump box. In snow clearing operations a large load of snow may harden during transit into one big ice mass preventing discharge under the top tailgate support. This means that when the load is ready to be dumped, the tailgate must be removed from the dump box which is a laborious and time consuming task. State and municipal governments require that load being hauled must be protected from accidental dumping during transit, so that the tailgate must be replaced on the dump body after each load is dumped thereby compounding the inefficiency. When the operator goes to clean the box, he is hindered by the presence of the tailgate that remains in a closed position unless the box is tilted to an angle making it dangerous for him to stand in the box.

Furthermore, the standard tailgate does not lend itself well to fine control or regulation of depositing crushed stone during a spreading operation. The outward pivoting movement of the tailgate permits the weight of the stone inside the box to have a tendency to push the gate open wider as the box is raised higher, thus releasing an excess amount of stone. Similarly, clean cutoff of the flow of material is prevented since the weight of the material is pushing outwardly opposite to the inward movement of the tailgate required to shut off the flow. What is needed has been found to be a tailgate adapted for hydraulic power opening and closing movement, and one with such movement being in a plane substantially transverse to the flow of material. This arrangement provides a substantial improvement in the ability of an operator to spread a uniform layer of crushed stone from a dump truck. Another desirable feature not heretofore available would enable the operator to load his truck with tree limbs and other trash with the cab protected by positioning the tailgate in a stowed position adjacent the front of the box, and then pivot the tailgate rearwardly for closing and to cleanly chop off the overhanging limbs for maximum load capacity and to eliminate unsightly and illegal protruding obstructions.

OBJECTIVES OF THE INVENTION

Accordingly, it is a main object of the present invention to provide combined tailgate and hoist to thereby improve the versatility of a dump truck.

It is another object of the present invention to provide a combined tailgate and dump box that allows maximum clearance for large load dumping and dump box cleaning.

It is still another object of the present invention to provide a tailgate construction that is effective to finely regulate aggregate during a spreading operation.

It is still another object of the present invention to provide a tailgate to protect the cab during loading and to sever overhanging loads when closed.

BRIEF DESCRIPTION OF THE INVENTION

According to the present invention, a tailgate is fabricated with an end panel to close the open rear end of the dump box and two forwardly extending side panels or members attached to the end panel to form a composite, U-shaped tailgate. The forward ends of the side panels are pivotally mounted at substantially the midpoint of the dump box. Power means is provided for pivoting the tailgate from a closed position to an intermediate over head position, and then over center to a stowed, out-of-the-way position at the forward end of the box. The same power means can return the tailgate in a reverse operation to the closed position.

The length of the side panels is such that the arc movement of the tailgate is at least substantially equal to the distance from the bottom of the box to the ground so that load attaching means on the end panel of the tailgate is effective to raise and lower a load between the box and the ground when the tailgate is actuated. The load, which may be any material or equipment that is commonly needed on a job site, such as sections of sewer pipe, large wheel and tire assemblies for earth moving equipment or air compressors, is simply attached to a chain fastened to the end panel and the tailgate raised to the over head position. In accordance with the invention, the load may be positioned at the rear of the box, moved forward to the center or midpoint of the box beneath the raised tailgate or moved still further to the front, solely by use of the power operated tailgate, which feature allows maximum utilization of the load space of the box.

The power means preferably comprises identical hydraulic cylinders mounted on each side of the dump box and attached to each of the side panels adjacent the pivot axis of the tailgate. Since the cylinders, their mounting and the operation is identical, only one cylinder need be discussed and described. The base of the cylinder is mounted for shifting movement in the longitudinal direction of the box. This is desired so that the tailgate may be taken over center in both directions of its operation. In one embodiment shown in the drawings, a jackscrew operated by an electric motor may serve to shift the base of the cylinder in order to obtain the precise repositioning necessary to allow the over centering action, especially when a load is attached to the tailgate. In both this preferred embodiment and in an alternative embodiment, the shifting of the base may also be accomplished automatically by mounting the base in a longitudinally extending slot, said base shifting in the direction of the center of gravity weight shift as the tailgate goes through the over center position. A novel over center latch may be used to positively secure the base at the ends of the slot.

When lifting a load with the tailgate, the center of gravity shifts toward the rear of the raising tailgate, which fact requires the tailgate to be taken an extra distance until the over center position is reached. As an example, for a 4000 pound maximum load and depending on several variables, such as the length of the lever arm and the exact construction and weight of the tailgate, an extra 10–15° must be incorporated in the raising movement of the tailgate. This is accommodated by moving the trolley member to the rearmost position and locking it in position, so as to gain the maximum travel of the piston rod to accommodate the extra movement necessary.

When the tailgate is to be moved from the forward stowed position, the base of the cylinder has automatically shifted along the slot in the trolley member toward the front of the box to gain the necessary extra throw for moving the tailgate back through the over center position. For lifting loads out of the box, the trolley member may be shifted to the forwardmost position to gain the necessary additional travel needed for the reverse shift of the center of gravity. The cylinder is operative to restrain the gravity movement of the tailgate so that the load may be eased down to the rest position after passing over center in either direction.

In economy embodiments of the tailgate of the present invention, the base of the cylinder may be permanently pinned in position along the side of the box so that the maximum throw in the raising mode of operation is obtained for gaining the over center travel in this direction. For the reverse operation, the dump box is merely raised to the dumping position shifting the center of gravity of the tailgate substantially to the rear so that the cylinder with the base in the fixed position can still obtain an over centering action to return the tailgate to the closed position. The use of this version as a cargo transport vehicle is restricted by the omission of the above described cylinder base shifting mechanism.

In accordance with another important feature of the present invention, the U-shaped tailgate is formed with side panels or frame members substantially equal to one-half of the length of the side walls of the dump box. The pivot means for the tailgate is thus positioned substantially at the midpoint of the length of the sides of the dump box and as the tailgate is raised the maximum height passing over the load is thereby obtained. This construction also gives the advantage of the tailgate being positioned immediately adjacent the forward wall of the dump box so as to be totally out of the way in the stowed position for facilitating cleaning of the box and allowing unobstructed dumping of large loads, such as boulders and tree stumps. Resting against the forward end of the box also affords the cab of the truck (not shown) protection during loading of the dump body with tree limbs and other trash that is frequently required in construction work. After the box has been completely loaded the tailgate may be returned and drawn down tight to the closed position under power of the cylinder, that may be dual acting for this purpose, neatly chopping off the ends of any tree limbs or other trash that is overhanging the rear of the box. Since the tailgate lowers substantially transverse to the plane of the bed of the dump box, this cutting off action is facilitated. Similarly, the spreading of crushed stone or other aggregate is facilitated since because of this transverse movement improved control of the flow of material and cleaner cutoff is obtained.

The width of the end panel of the tailgate is substantially equal to the outside width of the box so that the inside face of the side panels are in juxtaposition with the outside of the side walls of the box when the tailgate is in the closed position. The tailgate is constructed in a rigid horseshoe or U-shape that thus serves to hold the sides of the box together as it is loaded. The side panels are designed to slidably engage the outside surface of the dump box so that the tailgate may be raised or lowered while this holding function is occurring. The sides of the dump box are drawn in each time the tailgate is closed should the sides be spread apart by the load in the box. The guide means may include curved guide tabs, either on the top rail of the box or along the lower edge of the side panels, to assure proper initial engagement between the parts.

A supplemental feature of the tailgate and dump box combination of the present invention is directed to formation of an elongated storage compartment along the upper rail of the dump box. The tailgate completely closes off the end opening of the storage compartment when the gate is lowered to the closed position, thereby sealing off access to the tools to unauthorized persons. This storage compartment includes an auxiliary door for holding the tools in position during dumping.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figures 1, 2:
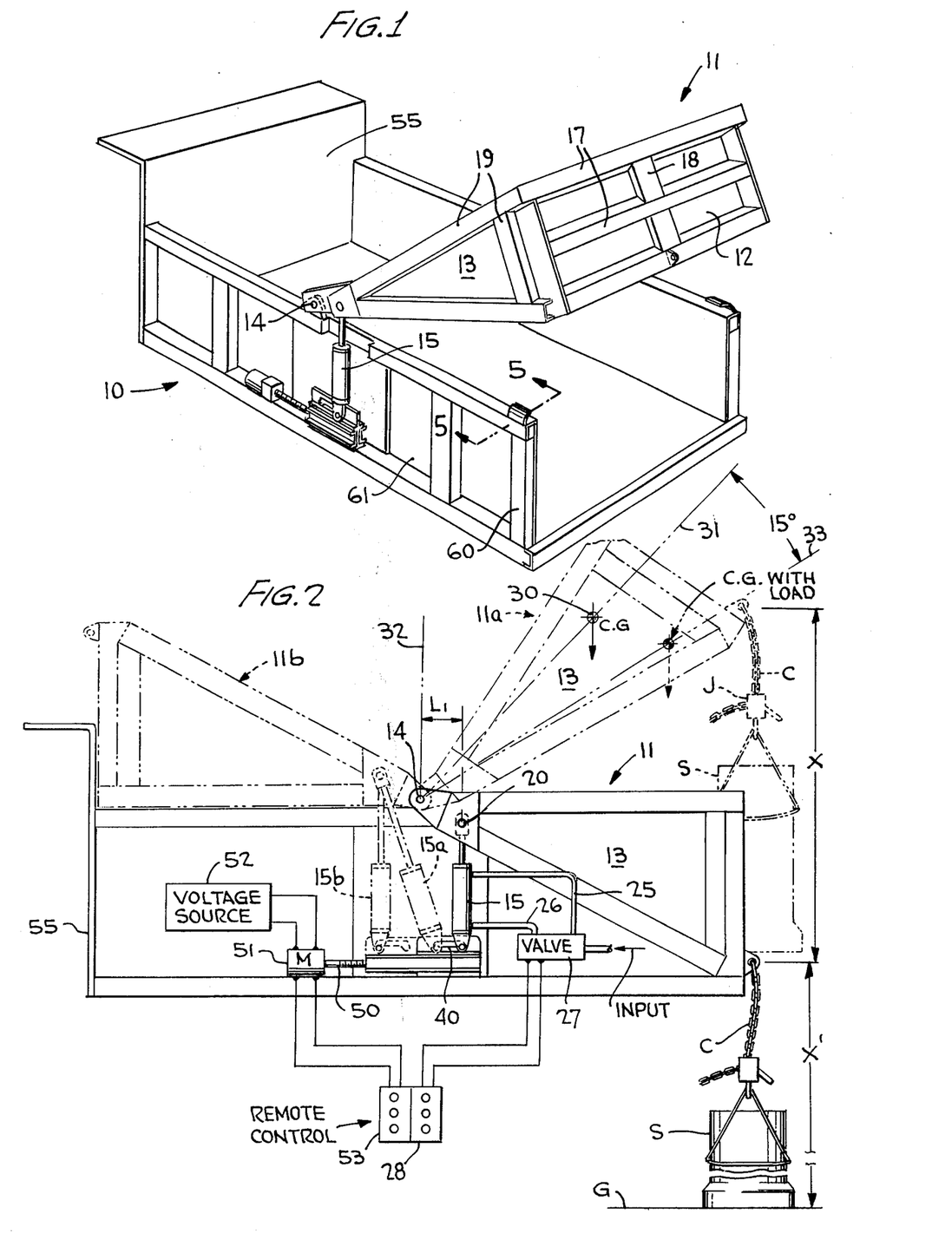
FIG. 1 is a perspective view of the tailgate and dump box combination built in accordance with the teachings of the present invention and in which view the tailgate is partially raised.
FIG. 2 is a side view of the tailgate and dump box combination showing the tailgate in various alternative positions and the manner in which a load is handled when utilizing the tailgate as a hoist.

With reference now to the drawings in composite, and particularly starting with FIG. 1, there is shown a dump box and tailgate combination, constructed in accordance with the principles of the present invention. There is provided in the novel combination, a dump box 10 which may be basically of conventional design and modified only to accommodate the features of the present invention, and a pivoted tailgate, generally designated by the reference numeral 11. The tailgate 11 includes an end panel 12 that is effective to close off the end opening of the dump box 10 and a pair of side panels or frame members 13 (see FIG. 4 for view of the top of the panel 13 not shown on the far side of FIG. 1) which panels together form a rigid U-shaped tailgate 11. The side panels may be a continuous or full-bodied triangular structure for added strength and full cooperation with the sides of the box 10. The tailgate is pivoted along the top of each side of the dump box at pivot points 14. Hydraulic cylinders 15 are also provided on both sides attached to the side panels 13 (see FIGS. 1 and 4). Since the structure on both sides of the dump box 10 are identical, the following description needs to be concerned with only the structure on one side, it being understood that the opposite side is identically fabricated.

The end panel 12 is formed with horizontal and vertical reinforcement members 17, 18 which serve to give the end panel 12 a high degree of rigidity and strength. The side panel 13 also includes strengthening elements 19. As thus fabricated, the tailgate 11 is substantially rigid and is capable of withstanding the forces of a full load in the box 10 tending to spread apart the side walls.

The cylinder 15 is pivotally attached to the side panel 13 by a pivot pin 20 positioned just to the rear of the pivot point 14 of the tailgate 11. In the position of the cylinder 15 as shown in FIG. 2, the tailgate 11 is lifted through operation of a lever arm $L_1$, which can be seen is advantageously at a maximum at the closed position of the tailgate where the maximum force is required.

The hydraulic cylinder is of the double acting type so that power may be applied to the tailgate 11 in both directions of movement. The pressurized hydraulic fluid may be provided to the cylinder 15 through any conventional system, as is shown schematically in FIG. 2. Thus, a pair of transfer lines 25, 26 are connected to opposite ends of the cylinder and fluid is fed and exhausted to the lines from a suitable hydraulic valve 27. A remote control panel 28 is preferably interconnected with the valve 27 to allow the operator to control the tailgate 11 while standing beside the vehicle to which the dump box and tailgate combination is attached.

In accordance with one important feature of the present invention as identified above, the tailgate 11 may be advantageously utilized as a hoist in order that the vehicle can be used as a cargo transport vehicle. To carry out this objective, the present invention envisions the side panels 13 as being of such a length that the chord X of the arc of movement of the end panel 12 is at least substantially equal in length to the distance X' from the ground G, as shown in FIG. 2. This feature allows a load, such as a section of sewer pipe S, to be picked up by a suitable load attaching chain C and lifted from the ground and deposited on the bed of the dump box 10. This in effect makes the combination dump box 10 and tailgate 11 a self-loading truck body that adds versatility to a dump truck and thereby gives its owner increased efficiency in its use.

As the tailgate is lifted upwardly to position 11a, the load is guided over the rear edge of the dump box 10 and into position at the rear of the box, as shown by the phantom line outline in FIG. 2. If desired, the operator may at this point disconnect the chain and leave the load positioned at this point. However, if it is desired to position the load S at the midpoint along the length of the box 10, then the operator merely continues to raise the tailgate 11 until the overhead position is reached, that is with the end panel 12 directly over the pivot point 14, whereupon the load S can be lowered by a suitable jack device J on the chain C and rested on the bed. Similarly, if the loading of the box 10 has just started, it may be desirable to continue with the movement of the tailgate to the forwardmost position adjacent the front of the box, as shown in phantom line position 11b in FIG. 2. This will assist the operator in moving the load S forward and the finl position can then be determined by manual handling. This loading feature and movement of the tailgate over the full length of the dump box 10 allows maximum utilization of the load space with a minimum effort being performed in actual lifting by the operator.

When the tailgate is being raised without a load from the closed position to the phantom raised position 11a of FIG. 2, the center of gravity is located inwardly from the right angle at the top of the tailgate 11 approximately a distance one-third along each leg of the triangle, or at point 30 (FIG. 2). With the center of gravity of the tailgate 11 at this point and located along what will be called the radial line 31, the cylinder 15 need only be capable of moving the tailgate 11 until said line 31 is just past over center or over head of the pivot point 14, thus represented by over center line 32. This relationship is shown in the enlarged view of FIG. 3 with the tailgate 11 in what will be referred to as over center position 11c.

However, as will be realized, when the tailgate 11 is being utilized as a hoist, the extra weight of the load S will cause the center of gravity to be relocated toward the far edge of the tailgate or along new radial line 33, also as shown in FIG. 2. Thus, the operator must be certain that the position of the hydraulic cylinder 15 is such that the maximum travel of the tailgate 11 is assured so that this line 33 will cross over the over center line 32. It will be realized that this relationship of the lines 31–33 and the obtaining of sufficient throw of the cylinder 15 to carry the tailgate 11 to the over center position 11c depends on several variables, including the length of the cylinder 15, the lever arm $L_1$ selected and the size of the tailgate and weight of the load, etc. The representative embodiment shown in the drawings is to be considered as showing one workable embodiment, and it is to be understood that changes can be made in the variables and parameters without departing from the broad concepts of the invention.

The maximum load that can thus be handled by the illustrated embodiment of the apparatus of the invention can thus be considered to move the secondary radial line 33 approximately 15°rearwardly, as shown in FIG. 2. In order to handle this maximum load, the cylinder 15 must be moved or shifted rearwardly or toward the rear of the dump box 10 as far as possible so that the cylinder 15 is capable of extending its piston rod to the maximum length to assure the travelling of the line 33 past the line 32.

Figures 3, 3A, 5:
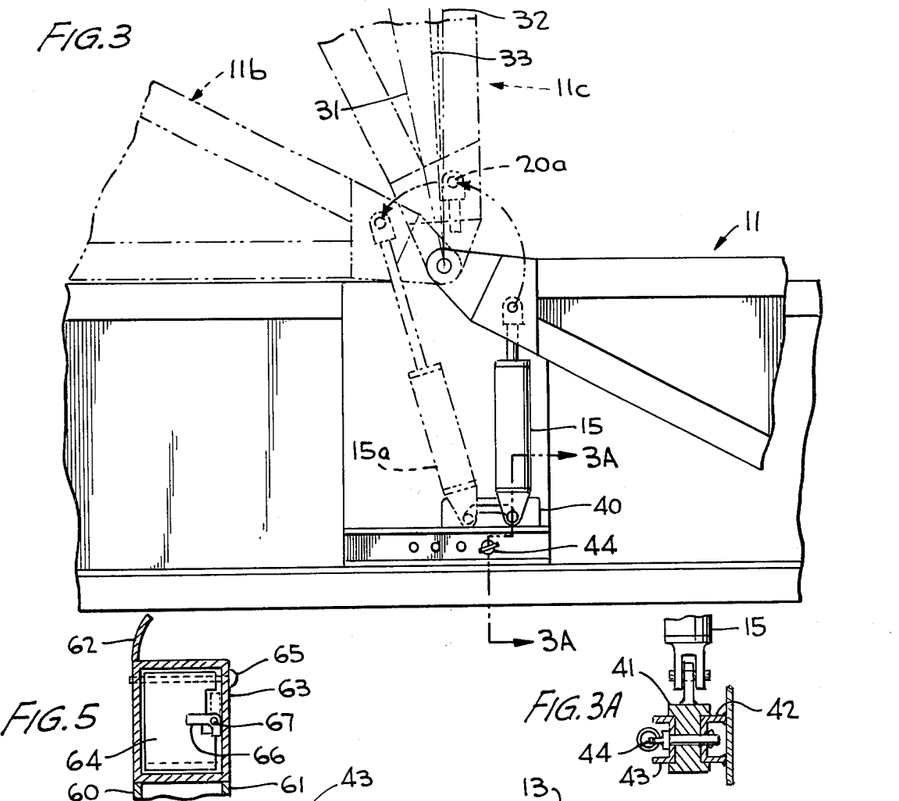
FIG. 3 is an enlarged detailed view showing the operation of the tailgate through the over center position and with an alternative embodiment of the cylinder base mounting means.
FIG. 3A is a cross sectional view taken along line 3A—3A of FIG. 3 showing the detailed construction of the alternative mounting means for the base of the hydraulic cylinder.
FIG. 5 is an enlarged cross sectional view taken along line 5—5 of FIG. 1 showing the guiding structure for the tailgate and the tool storage compartment formed in the upper rail of the box.

Once the tailgate 11 has passed the over center line 32, gravity urges the tailgate toward the forwardmost position 11b, as shown in FIGS. 2 and 3. However, the tailgate will not fall under its own weight since the cylinder 15 will at this point hold the same. By applying proper pressure and suction to the transfer lines 25, 26, respectively, the tailgate is eased down to the forwardmost position 11b and at which point the cylinder 15 is in the dotted line position 15a shown in FIG. 2.

In order for the cylinder 15 to reach the dotted line position 15a, the base of the cylinder has shifted forwardly along a guide slot 40, shown in both FIGS. 2 and 3. This guide slot 40 has locating notches at the end thereof to assure firm positioning of the base of the cylinder 15 at the limits of travel. This slot 40 allows shifting of the cylinder 15 with a pronounced movement as the pivot pin 20 moves from the position 20a, shown in FIG. 3, to a position just on the opposite side of the over center line 32. The movement may be assisted, if needed, by briefly sucking the cylinder 15 up on its piston rod as the tailgate goes over center. Alternatively, the shifting may be accomplished by holding the base at the one end of the slot during over center travel and then sucking the cylinder up after the tailgate has reached the new position. When the base of the cylinder comes to rest in the forward notch of the slot 40, the tailgate 11 is caught and then may be controllably lowered into position as described.

The slot 40 is formed in a trolley member 41 that is slidable along a track formed by the back-to-back channel members 42, 43, as shown in FIG. 3A of the drawings. In the alternative embodiment of FIG. 3, the trolley member 41 may be pinned in position by suitable pin 44 so that the slot 40 is maintained stationary during the operation involving raising or lowering the tailgate 11.

To get maximum throw of the cylinder 15 when the tailgate is initially in the forward stowed position 11b (required when lifting a load from this position, for example) said cylinder 15 must be moved to the new position 15b and this is done in accordance with the invention by movement of the trolley member 41 toward the front of the dump box 10 (see FIG. 2). In the preferred embodiment of FIGS. 1 and 2, a jackscrew 50 is threadedly engaged with the trolley member 41 and serves to move the same upon actuation by a suitable power means, such as electric motor 51. The motor may be provided with a suitable voltage source 52 and controlled by a remote switch panel 53.

Thus, in operation for returning the tailgate 11 to the closed position, the cylinder 15 is actuated, moving the tailgate 11 from the position 11b until the center of gravity passes back over the over center line 32. At this point, the weight of the tailgate 11 shifts the base of the cylinder along the slot 40 (again assisted or alternatively by operation of the hydraulic system) to the notch at the opposite end. Thereafter, the tailgate 11 is eased down in the full line closed position.

In the preferred embodiment of FIG. 2, no locking pin, such as locking pin 44, is required since the jackscrew 50 is self-locking and will hold the trolley member 41 in the proper position during operation of the tailgate 11. This arrangement is the preferred arrangement since the operator may quickly make the shift of the base of the cylinder 15 to quickly gain the maximum operational advantage when either opening the tailgate or, in the opposite mode, closing the tailgate.

When no load S is being handled, the trolley 41 does not have to be repositioned for reversing the movement of the tailgate 11. In other words, when opening, as soon as the radial line 31 of the tailgate passes the over center line 32, the cylinder base shifts along the slot 40 (see FIG. 3), the base is repositioned in the forward notch of the slot and the cylinder is then retracted to the final position 15a. Upon reverse actuation or the closing mode of operation, the cylinder 15 remains in the same position and is now operative to pass the tailgate 11 through the over center position and back to the closed position, that is without shifting of the trolley member 41.

In accordance with another feature of the invention, the side panels 13 of the tailgate 11 are substantially half of the length of the dump box 10, whereby said tailgate is stowed out of the way immediately adjacent forward wall 55 of the box (postition 11b) and maximum height of passage over a load in the dump box 10 is obtained. With this arrangement, large loads, such as boulders, large tree stumps or solidified snow loads can be easily dumped by merely positioning the tailgate 11 in either the overhead position 11c or the fully open position 11b and then effecting a rearward tilting of the dump box 10 to dump the load. The box 10 can be easily cleaned by the operator after lowering the box since the tailgate 11 remains in an out-of-the-way position.

Positioning the tailgate 11 adjacent the forward wall 55 of the dump box, as shown in position 11b, also serves the important purpose of protecting the cab (not shown) just to the front of the wall 55 while the box is being loaded with tree limbs, brush and other trash or debris. This feature adds a substantial safety factor so as to further enhance the value of the invention. Furthermore, when the tailgate 11 is returned to the closed position by operation of the cylinder 15, the bottom of the tailgate is operative to cleanly chop off any overhanging limbs or other material thereby preventing unsightly, and in some states unlawful, overhaning obstructions.

As can be seen in FIG. 2, the movement of the tailgate 11 is such that the end panel 12 is moving along a line substantially transverse to the bottom of the box 10 as it reaches the closed position. This feature not only allows the tailgate 11 of the invention to cleanly chop off overhanging limbs as described just above, but is of great importance in regulating the outflow of crushed stone or other aggregate material during a spreading operation. This is so since the stone leaving the box 10 through a regulated crack between the end panel 12 and the bottom of the box does not tend to push the tailgate open further, as in conventional tailgate structures. Since the end panel 12 is moving transverse to the flow of stone while being opened by the cylinder 15, there is no substantial force tending to open the tailgate wider, and thus a desired fine control and constant flow can be easily located and then maintained. Also, since the movement is substantially transverse upon closing, a clean cutoff of the flow of stone can also be obtained without difficulty.

Figure 4:
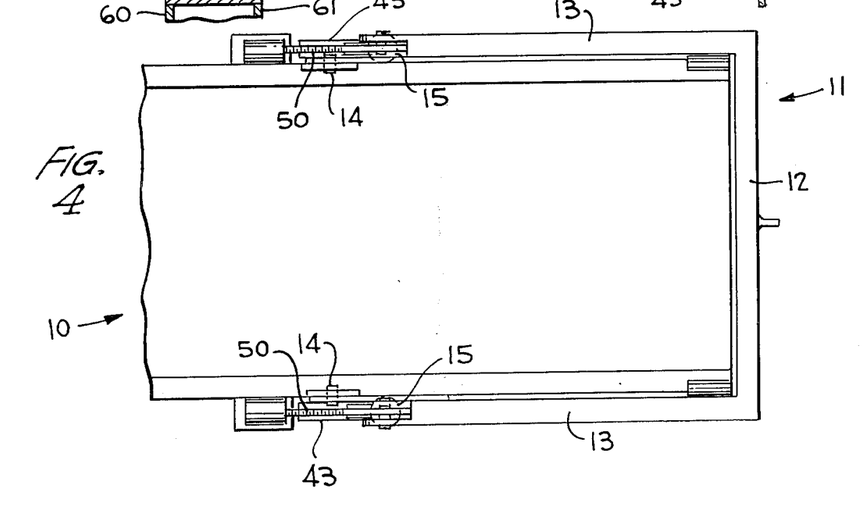
FIG. 4 is a top view of the tailgate and dump box combination with the tailgate closed so as to embrace the side walls of the box and showing the power means on both sides of the box.

The final major inventive feature has to do with the end panel 12 being substantially the same width as the box 10 so that the inside surface of the side panels 13 are operative to engage in sliding relationship with upstanding reinforcement channel 60 welded to side wall 61 of the box 10. In other words, as shown in FIG. 4 of the drawings, the U-shaped tailgate 11 has its side panels 13 in juxtaposition with the sides of the box 10. Since the tailgate 11 is of a rigid construction and sufficiently strong to resist outward spreading action of a load, no fixed cross supports between the spaced sides are required. As the tailgate 11 is lowered into the closed position, the side panels 13 engage the reinforcement member 60 and draw in the sides of the box should the same have been spread apart by a load. In order to facilitate initial engagement of the tailgate 11 with the sides, an upstanding curved tab 62 may be welded to top box rail 63 of the side wall 61 (see FIG. 5).

A supplemental feature of the invention is provided by a storage compartment formed in the end of the top rail 63. This allows storage of necessary dump box cleaning tools in a place readily accessible by the operator. The compartment may be provided with a false bottom, spaced for example approximately six feet from the open end so that the compartment will receive the usual tools, such as a shovel, a scraper and/or a broom. Of importance, when the tailgate 11 is in the closed position, the open end is totally obscured from view and access to the tools by an unauthorized person is prevented. In order to maintain the tools in the compartment during the dumping operation, an auxiliary door 64 pivoted at the top by a pin 65 is provided just inside the end opening. An L-shaped flag stop 66 pivoted at 67 maintains the door 64 closed until raised to the dotted line position whereupon be door may be swung open, toward the observer, as viewed in FIG. 5, for removal of the tools.

Figure 6:
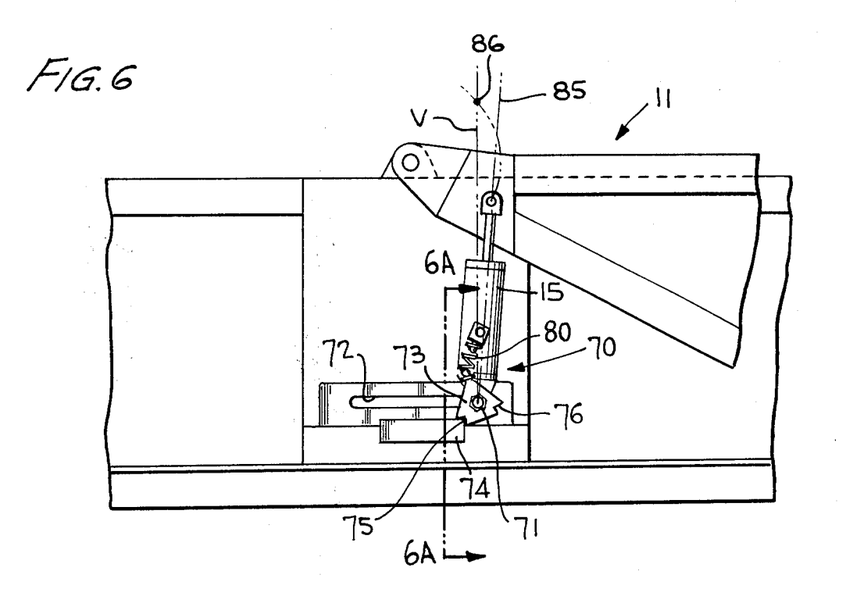
FIGS. 6, 6A, 7 and 8 are views showing the positive over center latching mechanism.
Figure 6A:
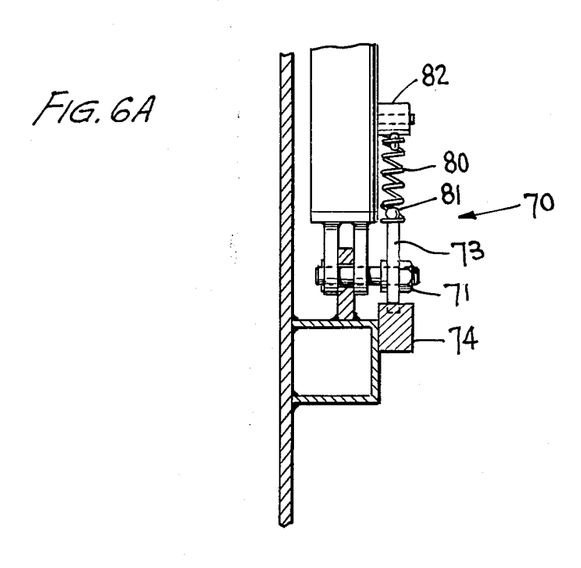
Figure 7:
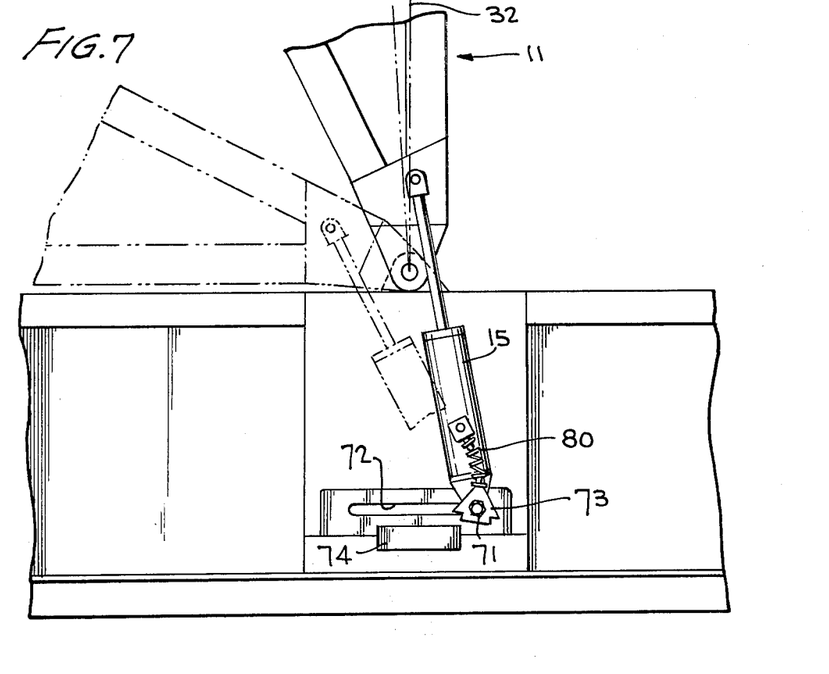
Figure 8:
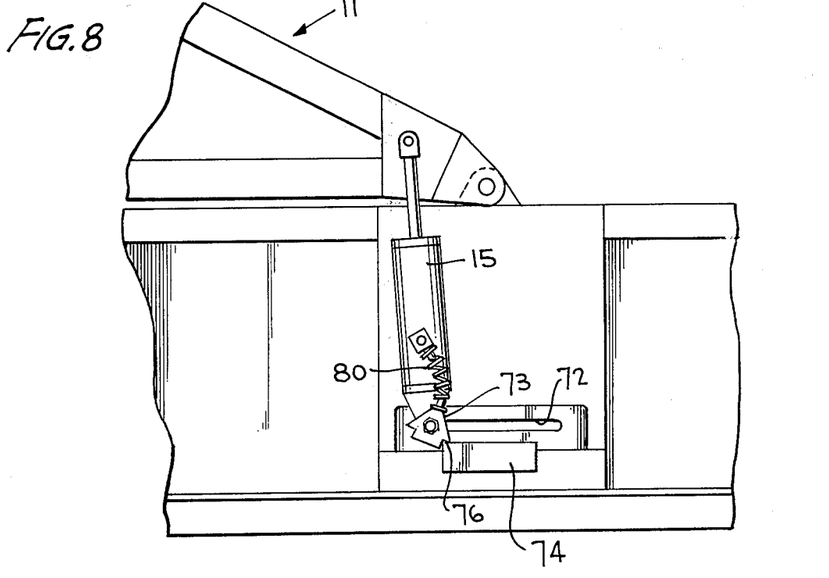

An important alternative embodiment of the means for shifting the base of the cylinder 15 in order to obtain the repositioning necessary to provide over center action, especially with a load attached to the tailgate 11, is shown in FIGS. 6–8. This means includes a positive action, over center latch, generally designated by the reference numeral 70, that is mounted on the base of the cylinder 15, as shown in these figures. The mechanical structure of the latch 70 can best be seen by comparison of FIGS. 6 and 6A and in light of the following description.

As in the foregoing embodiments, the cylinder 15 is pivotally mounted. This mounting may be effected by employment of a conventional pin 71, and the pin is mounted for sliding movement along a slot 72 for selective positioning of the base of the cylinder 15, as required. Mounted for pivotal movement on the outer end of the pin 71 is a triangular shaped latching member 73 adapted to cooperate with a stop block 74 situated midway along the extent of the slot 72. The latching member 73 has notches 75, 76 formed at the opposite corners of the base, which notches cooperate with opposite ends of the stop block 74 to positively hold the cylinder 15 in position, as desired.

The latching member 73 is controlled automatically in a novel fashion. The motive force for the control action derives from the over center spring 80 having its lower end attached to a spherical knob 81 at the top of the latching member 73. At the top of the spring, there is provided a mounting block 82 with a downwardly extending finger permanently holding the top of the spring in position and generally along the axis of the cylinder 15. The spring 80 is of a length to be under compression when the latching member 73 is positioned such that the knob 81 is also along the axis of the cylinder 15. This means that the spring thus provides the over center action whereby the latching member 73 is positioned tilted to the left, as viewed in FIG. 6, or to the right, as viewed in FIG. 7.

In operation, the tailgate 11 in the closed position is ready to be opened by the cylinder 15 in FIG. 6. In this lowermost position, cylinder 15 has its axis 85 a few degrees to the right of the vertical line V. The upper mounting block 82 has pssed over the center of the pivot pin 71 and has thus caused the latching member 73 to tilt leftwardly as shown. In this position, the notch 75 is in engagement with the righthand end of the stop block 74. It should be noted that the side or vertical face of the notch 75 prevents movement of the mounting pin 71 to the left along the slot 72. The face extending at 90° thereto, or substantially horizontal, in engagement with the upper surface of the stop block 74 serves the important purpose of preventing over pivoting of the latching member 73 and possible loss of the positive latching engagement.

As the tailgate 11 is opened, that is, moved upwardly, the cylinder 15 will be pivoted first on the pin 71 further to the right, as viewed in FIG. 6. The path of the attaching pin on the end of the piston of the cylinder 15 is shown in dashed line outline in FIG. 6. After the point 86 on this path is reached where the cylinder goes over center or past the vertical line V, the latching mechanism 70 is ready to be automatically released. By the time that the over center position of the tailgate 11 has been reached as shown in full line outline in FIG. 7, the cylinder 15 is well over center and the spring 80 is in position to immediately snap the latching member 73 to the right, thus releasing the same. The weight of the tailgate 11 acting through the cylinder 15 prior to the over center movement but after the cylinder passes the line V keeps the notch 75 urged against the cooperating edge with sufficient force to over ride the slight spring action from the spring 80, thus assuring that the latching member 73 is not prematurely snapped out of locking engagement. At this point, however, since the tailgate 11 has passed the over center line 32, the weight of the tailgate is now pushing the mounting pin 71 to the right (in FIG. 7) forcing the same to the end of the slot 72. The end of the slot 72 may extend a slight distance beyond the point where the pin 71 has been resting when the latch is engaged so that the latching member 73 will have clearance for snapping to the unlatched position shown. The tailgate 11 is now allowed to continue to the fully open position, as shown in the dashed outline of FIG. 7, while the cylinder 15 is continued to be urged to the right and against the end of the guide slot 72.

When the fully open position has been reached, the cylinder 15 is ready to be shifted along the slot 72 to the opposite end so that the full leverage and over center travel of the tailgate 11 can be most expeditiously accommodated. To explain, it will be realized that, with the latching member 73 in the tilted (to the right) position of FIG. 7, the bottom of the member will be free to travel over the stop block 74, since the leading edge of the latch member 73 is raised above the adjacent locking edge. The bottom of the latching member 73 may slide across the top of the stop lock 74 since it is only resiliently held by the over center spring 80. However, the latching member 73 remains in the position tilted to the right since the cylinder does not at any time pass back through the vertical line V during the travel of the base along the slot 72. As in the foregoing embodiments, the base of the cylinder 15 is, of course, moved by merely reversing the hydraulic pressure so that the cylinder 15 is drawn up along the piston rod.

The final position at the opposite end of the slot 72, that is the end adjacent the front of the dump box, is shown in FIG. 8. The latching member 73, as it passes over the end of the stop block 74, snaps down into position with the notch 76 engaging the adjacent edge. Accordingly, when the cylinder 15 is energized to raise the tailgate 11 toward the closed position, the base of the cylinder 15 will be positively held against movement to the right (FIG. 8) and the maximum leverage may be obtained. As the overcenter position is reached on this reverse movement of the tailgate 11, the latching member 73 will be snapped back over center. The base of the cylinder 15 can be shifted to the opposite (rear) end of the slot 72 by reversing the pressure as before, once the fully closed position (see FIG. 6) is reached.

In view of the above description, the results and advantages of the tailgate 11 and the dump box 10 combination of the present invention can now be realized. The use of the tailgate as a hoist as shown in FIG. 2 of the drawing greatly increases the versatility of the vehicle upon which the apparatus of the present invention is attached. The base of the cylinder 15 is shiftable along the sides of the box 10 to gain maximum leverage for operation of the gate 11. In one embodiment, the base of the cylinder 15 is positively latched in position and then automatically released by the over center mechanism 70. The end panels 13 of the tailgate 11 are approximately one-half the length of the side walls of the box so that maximum height over the load is obtained and thereby dumping of large loads is facilitated. Positioning of the tailgate at the front of the box also protects the cab during loading of tree limbs and other trash and cutoff of overhanging limbs is effected upon reverse movement of the tailgate to the closed position. The side panels are in guiding and holding juxtaposition with the side walls of the box so that no fixed cross support that would obstruct discharging of a load is required. Should the side walls be spread apart by a load, they are drawn back in with each closing of the tailgate 11.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A combined tailgate and hoist for a vehicle dump box comprising an end panel spanning the open rear end of said box, two side members secured to said end panel to form a composite U-shaped tailgate, said end panel being connected only to said side members, reinforcement means on the side members and end panel of said tailgate to render the same capable of supporting relatively heavy lifted loads suspended therefrom, means for pivotally mounting said side members along the sides and adjacent the top of said box, the length of said side members being such that arc movement of the tailgate is sufficient for the end panel to move upwardly a distance at least substantially equal to the distance from the bottom of the box to the ground and longitudinally at least substantially to the midpoint of the box, hoist means on said tailgate for supporting a load, and power means independent of the dumping action for pivoting said composite tailgate to open and close the rear end of the box and to transfer through said hoist means a load attached to said end panel between the box and the ground.

2. The tailgate and hoist of claim 1 wherein said power means includes a hydraulic cylinder mounted on the side of said box and attached to at least one side member adjacent the pivot mounting of said tailgate, the base of said cylinder being attached to said box and positioned so as to cause the center of gravity of said tailgate to move the same over center for assuring movement of the tailgate between the extreme open and closed positions.

3. The tailgate and hoist of claim 2 wherein is further provided means for movably mounting the base of said cylinder to allow shifting in the direction of the longitudinal axis of said box, and second power means for shifting said base to change the effective mounting point of the cylinder base for positive control of movement of the tailgate in both directions.

4. The tailgate and hoist of claim 3 wherein said second power means comprises a jackscrew, and motor means therefor to effect independent shifting of said cylinder to provide over center movement in both directions.

5. The tailgate and hoist of claim 2 wherein is provided means for movably mounting the base of said cylinder to allow shifting in the direction of the longitudinal axis of said box, including a trolley member, a longitudinally extending slot in said member for holding the base of said cylinder captive, means for positioning said trolley member on said box so as to provide variable over center positions of said tailgate in accordance with the load being lifted, said slot allowing movement of the base of said cylinder between spaced front and rear actuating positions to automatically accommodate for over center movement.

6. The tailgate and hoist of claim 2 wherein is further provided means for movably mounting the base of said cylinder to allow shifting in the direction of the longitudinal axis of said box, a longitudinally extending slot in said member for holding the base of said cylinder captive, said slot allowing movement of the base of said cylinder between spaced front and rear actuating positions to automatically accommodate for over center movement.

7. The tailgate and hoist of claim 6 wherein is further provided over center means on said cylinder for positively latching said cylinder in position at one end of said slot and is automatically released as the tailgate passes over center.

8. The tailgate and hoist of claim 7 wherein said over center means comprises a triangular latching member pivotally mounted on the base of said cylinder, a stop block adjacent said slot for engaging the adjacent edge of said member and a spring mounted on said cylinder to urge the member toward the side opposite the cylinder.

9. The tailgate and hoist of claim 8 wherein is provided notches on the base of the triangle for engaging the edges of said stop block, whereby pivoting of the member under force is prevented.

10. The combined tailgate and hoist of claim 1 wherein said hoist means on said tailgate comprises a chain and means for attaching said chain to said load.

11. The combined tailgate and hoist of claim 10 wherein said hoist means further includes a jack device for assisting in transferring said load.

12. A tailgate and a vehicle dump box combination comprising an end panel spanning the open rear end of said box, two side members secured to said end panel to form a composite U-shaped tailgate, said end panel being connected only to said side members, reinforcement means on said tailgate to render the same capable of sustaining relatively large spreading forces inside the box and supporting relatively heavy lifted loads suspended therefrom, means for pivotally mounting said side members along the sides of said box, the width of said end panel being substantially equal to the outside width of said box so that the insides of said side panels are in guiding and holding juxtaposition with said box, power means independent of the dumping action for pivoting said tailgate to open and close the same and guide means for drawing in the sides of said box upon closing said tailgate when spread by a load, whereby fixed cross support of said box is unnecessary, said end panel and side members being rigidly fastened together in order to form a substantially rigid composite tailgate, said panel and members being reinforced sufficiently to withstand the forces of a full load tending to spread the sides of said box, the length of said side members being such that arc movement of the tailgate is sufficient for the end panel to move upwardly a distance at least substantially equal to the distance from the bottom of the box to the ground and longitudinally at least substantially to the midpoint of the box, hoist means on said tailgate for supporting a load, to transfer a load attached to said end panel between the box and the ground.

* * * * *